US011614976B2

United States Patent
Ramanathan et al.

(10) Patent No.: US 11,614,976 B2
(45) Date of Patent: *Mar. 28, 2023

(54) SYSTEM AND METHOD FOR DETERMINING AN AMOUNT OF VIRTUAL MACHINES FOR USE WITH EXTRACT, TRANSFORM, LOAD (ETL) PROCESSES

(71) Applicant: ORACLE INTERNATIONAL CORPORATION, Redwood Shores, CA (US)

(72) Inventors: Krishnan Ramanathan, Bengaluru (IN); Jagan Narayanareddy, Pleasanton, CA (US); Gunaranjan Vasireddy, Hyderabad (IN); Aman Madaan, Pittsburgh, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 16/853,428

(22) Filed: Apr. 20, 2020

(65) Prior Publication Data

US 2020/0334271 A1 Oct. 22, 2020

Related U.S. Application Data

(63) Continuation-in-part of application No. 16/852,509, filed on Apr. 19, 2020.

(30) Foreign Application Priority Data

Apr. 18, 2019 (IN) .............................. 201941015559
Apr. 18, 2019 (IN) .............................. 201941015562

(Continued)

(51) Int. Cl.
G06F 9/50 (2006.01)
G06F 9/455 (2018.01)
(Continued)

(52) U.S. Cl.
CPC ........ G06F 9/5077 (2013.01); G06F 9/45558 (2013.01); G06F 9/544 (2013.01);
(Continued)

(58) Field of Classification Search
None
See application file for complete search history.

(56) References Cited

U.S. PATENT DOCUMENTS 7,151,438 B1 12/2006 Hall et al.
7,739,292 B2 * 6/2010 Falk ........................ G06F 16/26
707/760

(Continued)

FOREIGN PATENT DOCUMENTS

EP 3352103 7/2018

OTHER PUBLICATIONS

Sun et al.; "SETL: A Scalable And High Performance ETL System", IEEE 2012; (Sun_2012.pdf; pp. 6-9) (Year: 2012).*

(Continued)

*Primary Examiner* — Hiren P Patel
(74) *Attorney, Agent, or Firm* — Tucker Ellis LLP

(57) ABSTRACT

In accordance with an embodiment, described herein are systems and methods for determining or allocating an amount, quantity, or number of compute instances or virtual machines for use with extract, transform, load (ETL) processes. In an example embodiment, a particular (e.g., optimal) number of virtual machines (VM's) can be determined by predicting ETL completion times for customers, using historical data. ETL processes can be simulated with an initial/particular number of virtual machines. If the predicted (Continued)

duration is greater than the desired duration, the number of virtual machines can be incremented, and the simulation repeated. Actual completion times from ETL processes can be fed back, to update a determined number of compute instances or virtual machines. In accordance with an embodiment, the system can be used, for example, to generate alerts associated with customer service level agreements (SLA's).

18 Claims, 15 Drawing Sheets

(30) Foreign Application Priority Data

| Apr. 18, 2019 | (IN) | 201941015571 |
|---|---|---|
| Apr. 18, 2019 | (IN) | 201941015572 |
| Apr. 18, 2019 | (IN) | 201941015582 |
| Apr. 18, 2019 | (IN) | 201941015583 |

(51) Int. Cl.
  *G06F 16/25* (2019.01)
  *G06F 16/28* (2019.01)
  *G06F 9/54* (2006.01)

(52) U.S. Cl.
  CPC .......... *G06F 16/254* (2019.01); *G06F 16/256* (2019.01); *G06F 16/283* (2019.01); *G06F 2009/45562* (2013.01); *G06F 2009/45595* (2013.01); *G06F 2209/5019* (2013.01); *G06F 2209/5022* (2013.01)

(56) References Cited

U.S. PATENT DOCUMENTS

| 7,974,896 | B2 | 7/2011 | Busse et al. |
| 8,010,426 | B2 | 8/2011 | Kopp et al. |
| 8,386,419 | B2 | 2/2013 | Yalamanchilli |
| 8,543,535 | B2* | 9/2013 | Satpathy ............... G06F 16/283 707/604 |
| 8,719,769 | B2* | 5/2014 | Castellanos ........... G06F 9/4494 707/602 |
| 8,775,372 | B2 | 7/2014 | Dary |
| 8,983,914 | B2 | 3/2015 | Kung et al. |
| 9,430,505 | B2 | 8/2016 | Padmanabhan et al. |
| 9,442,993 | B2 | 9/2016 | Tung |
| 9,460,188 | B2 | 10/2016 | Mundlapudi et al. |
| 9,483,537 | B1* | 11/2016 | Peters ................... G06F 16/254 |
| 9,619,535 | B1 | 4/2017 | Kapoor |
| 9,904,706 | B2* | 2/2018 | Bhattacharjee ....... G06F 16/283 |
| 9,922,104 | B1* | 3/2018 | Kapoor ................. G06F 16/254 |
| 9,961,011 | B2 | 5/2018 | Mordani |
| 9,971,819 | B2 | 5/2018 | Bender |
| 10,055,431 | B2 | 8/2018 | Marrelli et al. |
| 10,078,676 | B2* | 9/2018 | Bhagat ................. G06F 16/258 |
| 10,108,683 | B2* | 10/2018 | Dhayapule ............. G06F 16/84 |
| 10,275,409 | B2* | 4/2019 | Tung ..................... G06F 16/254 |
| 10,423,639 | B1* | 9/2019 | Kapoor ................. G06F 16/254 |
| 10,423,688 | B1* | 9/2019 | Patton .................. G06F 16/9535 |
| 10,437,846 | B2* | 10/2019 | Venkatasubramanian .................. G06F 16/283 |
| 10,509,683 | B2 | 12/2019 | Furman |
| 10,685,033 | B1* | 6/2020 | Searls .................... G06F 16/54 |
| 10,860,562 | B1* | 12/2020 | Gupta ................. G06F 16/2453 |
| 11,269,911 | B1 | 3/2022 | Jones |
| 11,321,290 | B2 | 5/2022 | Yan |
| 2002/0178077 | A1 | 11/2002 | Katz et al. |
| 2006/0195492 | A1* | 8/2006 | Clark ................... G06F 16/283 |
| 2008/0162509 | A1* | 7/2008 | Becker ................... G06F 16/27 |
| 2008/0195430 | A1 | 8/2008 | Rustagi |
| 2008/0250057 | A1 | 10/2008 | Rothstein et al. |
| 2011/0055231 | A1* | 3/2011 | Huck .................. G06F 16/2471 707/774 |
| 2011/0295795 | A1* | 12/2011 | Venkatasubramanian .................. G06F 16/254 707/602 |
| 2012/0198466 | A1 | 8/2012 | Cherkasova |
| 2012/0310875 | A1* | 12/2012 | Prahlad ............... G06F 16/2465 707/602 |
| 2013/0166515 | A1 | 6/2013 | Kung et al. |
| 2013/0191306 | A1 | 7/2013 | Wilkinson |
| 2013/0238641 | A1* | 9/2013 | Mandelstein ........... G06F 16/27 707/E17.014 |
| 2014/0164033 | A1 | 6/2014 | Baskaran et al. |
| 2014/0229511 | A1 | 8/2014 | Tung |
| 2014/0349272 | A1 | 11/2014 | Kutty et al. |
| 2015/0207758 | A1 | 7/2015 | Mordani |
| 2015/0256475 | A1 | 9/2015 | Suman et al. |
| 2016/0292192 | A1 | 10/2016 | Bhagat |
| 2016/0306827 | A1 | 10/2016 | Dos Santos et al. |
| 2016/0314176 | A1* | 10/2016 | Dhayapule ............ H04L 47/125 |
| 2016/0328566 | A1 | 11/2016 | Nellamakkada |
| 2017/0011087 | A1* | 1/2017 | Hyde ................. G06F 16/2365 |
| 2017/0104627 | A1 | 4/2017 | Bender et al. |
| 2018/0060402 | A1* | 3/2018 | Fabjanski ............. G06F 16/254 |
| 2018/0150528 | A1 | 5/2018 | Shah |
| 2018/0150529 | A1 | 5/2018 | McPherson et al. |
| 2019/0079796 | A1 | 3/2019 | Asahara |
| 2019/0294596 | A1 | 9/2019 | Yan |
| 2020/0004863 | A1* | 1/2020 | Kumar ................ G06F 11/3452 |
| 2020/0012647 | A1* | 1/2020 | Johnson, III ...... G06F 16/24556 |
| 2020/0334089 | A1 | 10/2020 | Ramanathan |
| 2020/0334267 | A1 | 10/2020 | Ramanathan |
| 2020/0334268 | A1 | 10/2020 | Vasireddy |
| 2020/0334270 | A1 | 10/2020 | Vasireddy |
| 2020/0334608 | A1 | 10/2020 | Ramanathan |
| 2020/0349155 | A1 | 11/2020 | Reinshagen |
| 2021/0049183 | A1 | 2/2021 | Ramanathan |

OTHER PUBLICATIONS

Zdravevski et al.; "Cluster-size optimization within a cloud-based ETL framework for Big Data"; 2019 IEEE International Conference on Big Data; (Zdravevski_2019.pdf; pp. 3754-3763) (Year: 2019).*

Dageville et al; "The Snowflake Elastic Data Warehouse"; Snowflake Computing; ACM 2016 (Dageville_2016.pdf; pp. 215-226) (Year: 2016).*

Ganapathi et al; "Statistics-Driven Workload Modeling for the Cloud"; University of California at Berkeley; IEEE 2010 (Ganapathi_2010.pdf; pp. 87-92) (Year: 2010).*

Tu et al; "An Intelligent ETL Workflow Framework based on data Partition"; IEEE 2010; (Tu_2010.pdf; pp. 358-363) (Year: 2010).*

"Cross-tenant analytics using extracted data—single-tenant app", published Dec. 18, 2018, retrieved from https://docs.microsoft.com/en-us/azure/sql-database/saas-tenancy-tenant-analytics on Dec. 5, 2019, 15 pages.

"ETL Validator: Key Features", retrieved from https://www.datagaps.com/etl-testing-tools/etl-validator/ on Nov. 27, 2019, 2 pages.

Gawande, Sandesh; "ETL Strategy for the Enterprise: ETL Startegy to store data validation rules", ETLGuru, retrieved from http://etlguru.com/?p=22 on Nov. 27, 2019, 2 pages.

Homayouni, Hajar; "An Approach for Testing the Extract-Transform-Load Process in Data Warehouse Systems", Thesis, Fall 2017, Colorado State University, 96 pages.

Kim, et al., "A Component-Based Architecture for Preparing Data in Data Warehousing", Jun. 2000, retrieved from https://www.researchgate.net/profile/Eui_Hong2/publication/2466873_A_Component-Based_Architecture_for_Preparing_Data_in_Data_Warehousing/links/541be8930cf25ebee98dac5c/A-Component-Based-Architecture-for-Preparing-Data-in-Data-Warehousing.pdf, 8 pages.

"Making cloud ETL routines work", The Chartered Institute for IT, published Sep. 6, 2017, retrieved from https://www.bcs.org/content-hub/making-cloud-etl-routines-work/ on Dec. 5, 2019, 4 pages.

Ong, et al., "Dynamic-ETL: a hybrid approach for health data extraction, transformation and loading", published on Sep. 13, 2017, retrieved from https://www.ncbi.nlm.nih.gov/pmc/articles/PMC5598056/ on Nov. 27, 2019, 10 pages.

(56) References Cited

OTHER PUBLICATIONS

Subash, Muthiah; "An Approach to Multi-Tenant Customer Data Isolation Using SQL Server and Tableau 8.1", published Jun. 18, 2014, retrieved from https://www.credera.com/blog/business-intelligence/approach-multi-tenant-customer-data-isolation-using-sql-server-tableau-8-1/, 6 pages.

"Use Power BI with SQL Data Warehouse", Engineering ME366, Boston University Academy, retrieved from https://www.coursehero.com/file/p25tovsh/Scored-Labels-the-classification-done-by-the-model-bike-buyer-1-or-not-0-This/on Nov. 27, 2019, 1 page.

United States Patent and Trademark Office, Notice of Allowance and Fee(s) Due dated Sep. 2, 2022 for U.S. Appl. No. 16/862,394, 9 pages.

United States Patent and Trademark Office, Office Communication dated May 11, 2022 for U.S. Appl. No. 16/862,394, 19 pages.

United States Patent and Trademark Office, Office Communication dated Aug. 19, 2021 for U.S. Appl. No. 16/862,394, 15 pages.

Oracle, "Fusion Middleware Developing Integration Projects with Oracle Data Integrator 12c (12.2.1.1)", May 2016, 340 pages.

Oracle, "Fusion Middleware Developing Integration Projects with Oracle Data Integrator—Overview of Oracle Data Integrator Topology", 4 pages, retrieved on Oct. 20, 2022 from: <https://docs.oracle.com/middleware/12211/odi/develop/setup_topology.htm#ODIDG171>.

United States Patent and Trademark Office, Office Communication dated Sep. 21, 2021 for U.S. Appl. No. 16/852,070, 17 pages.

United States Patent and Trademark Office, Office Communication dated Feb. 22, 2022 for U.S. Appl. No. 16/852,070, 22 pages.

United States Patent and Trademark Office, Notice of Allowance and Fee(s) Due dated Oct. 20, 2022 for U.S. Appl. No. 16/852,070, 10 pages.

United States Patent and Trademark Office, Office Communication dated Jun. 17, 2022 for U.S. Appl. No. 16/852,509, 22 pages.

Zdravevski, Eftim et al., "Cluster-size optimization within a cloud-based ETL framework for Big Data", 2019 IEEE International Conference on Big Data (Big Data), © 2019 IEEE, 10 pages.

Sun, Kunjian et al., "SETL: A Scalable And High Performance ETL System", 2012 3rd International Conference on System Science, Engineering Design and Manufacturing Informatization, © 2012 IEEE, 4 pages.

\* cited by examiner

SYSTEM AND METHOD FOR DETERMINING AN AMOUNT OF VIRTUAL MACHINES FOR USE WITH EXTRACT, TRANSFORM, LOAD (ETL) PROCESSES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to India Provisional Patent Application titled "SYSTEM AND METHOD FOR AUTOMATIC GENERATION OF EXTRACT, TRANSFORM, LOAD (ETL) ASSERTS", Application No. 201941015571, filed Apr. 18, 2019; India Provisional Patent Application titled "SYSTEM AND METHOD FOR RANKING OF EXTRACT, TRANSFORM, LOAD (ETL) ALERTS", Application No. 201941015572, filed Apr. 18, 2019; India Provisional Patent Application titled "SYSTEM AND METHOD FOR OPTIMIZATION OF VIRTUAL MACHINES FOR EXTRACT, TRANSFORM, LOAD (ETL)", Application No. 201941015582, filed Apr. 18, 2019; India Provisional Patent Application titled "SYSTEM AND METHOD FOR DETERMINATION OF RECOMMENDATIONS AND ALERTS IN AN ANALYTICS ENVIRONMENT", Application No. 201941015583, filed Apr. 18, 2019; India Provisional Patent Application titled "SYSTEM AND METHOD FOR AUTO-CORRECTION/REJECTION IN AN ANALYTICS ENVIRONMENT", Application No. 201941015559, filed Apr. 18, 2019; and India Provisional Patent Application titled "SYSTEM AND METHOD FOR RUNNING WAREHOUSE LOADS FOR MULTIPLE TENANTS OF A DATA WAREHOUSE", Application No. 201941015562, filed Apr. 18, 2019; each of which above applications are herein incorporated by reference.

Cross-Reference to Related Applications

This application is related to U.S. Patent Application titled "SYSTEM AND METHOD FOR AUTOMATIC CORRECTION/REJECTION IN AN ANALYTIC APPLICATIONS ENVIRONMENT", application Ser. No. 16/852,065, filed Apr. 17, 2020; U.S. Patent Application titled "SYSTEM AND METHOD FOR RUNNING WAREHOUSE LOADS FOR MULTIPLE TENANTS OF A DATA WAREHOUSE", application Ser. No. 16/852,070, filed Apr. 17, 2020; U.S. Patent Application titled "SYSTEM AND METHOD FOR AUTOMATIC GENERATION OF EXTRACT, TRANSFORM, LOAD (ETL) ASSERTS", application Ser. No. 16/851,869, filed Apr. 17, 2020; and U.S. Patent Application titled "SYSTEM AND METHOD FOR DETERMINATION OF RECOMMENDATIONS AND ALERTS IN AN ANALYTICS ENVIRONMENT Ser. No. 16/851,872, filed Apr. 17, 2020; each of which above applications are herein incorporated by reference.

TECHNICAL FIELD

Embodiments described herein are generally related to computer data analytics, and systems and methods for use with an analytic applications environment, for determining an amount or number of compute instances or virtual machines for use with extract, transform, load (ETL) processes.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

Cloud-based computing environments and data warehouses can enable extract, transform, load (ETL) processes to be performed for multiple customers, using the shared resources of the cloud or data warehouse environment. In such environments, ETL processes may be associated with customer service level agreements (SLA's) specified for each different customer. However, since each customer's data growth may not be linear, or may grow rapidly within a relatively short period of time; it can be challenging to ensure that the processing time associated with their data remains within any specified SLA.

SUMMARY

In accordance with an embodiment, described herein are systems and methods for determining or allocating an amount, quantity, or number of compute instances or virtual machines for use with extract, transform, load (ETL) processes. In an example embodiment, a particular (e.g., optimal) number of virtual machines (VM's) can be determined by predicting ETL completion times for customers, using historical data. ETL processes can be simulated with an initial/particular number of virtual machines. If the predicted duration is greater than the desired duration, the number of virtual machines can be incremented, and the simulation repeated. Actual completion times from ETL processes can be fed back, to update a determined number of compute instances or virtual machines. In accordance with an embodiment, the system can be used, for example, to generate alerts associated with customer service level agreements (SLA's).

DETAILED DESCRIPTION

Figure 1:
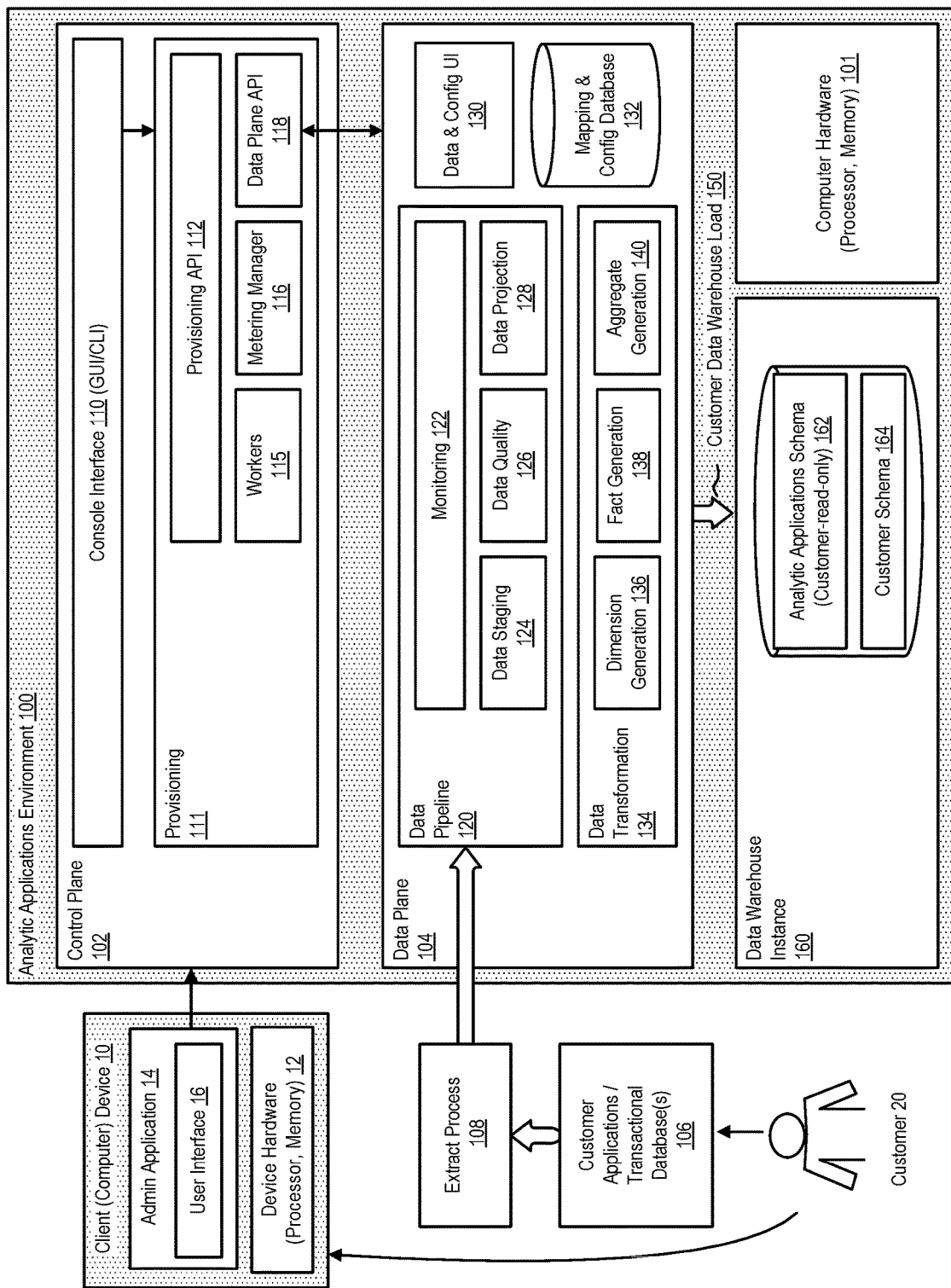
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset incudes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
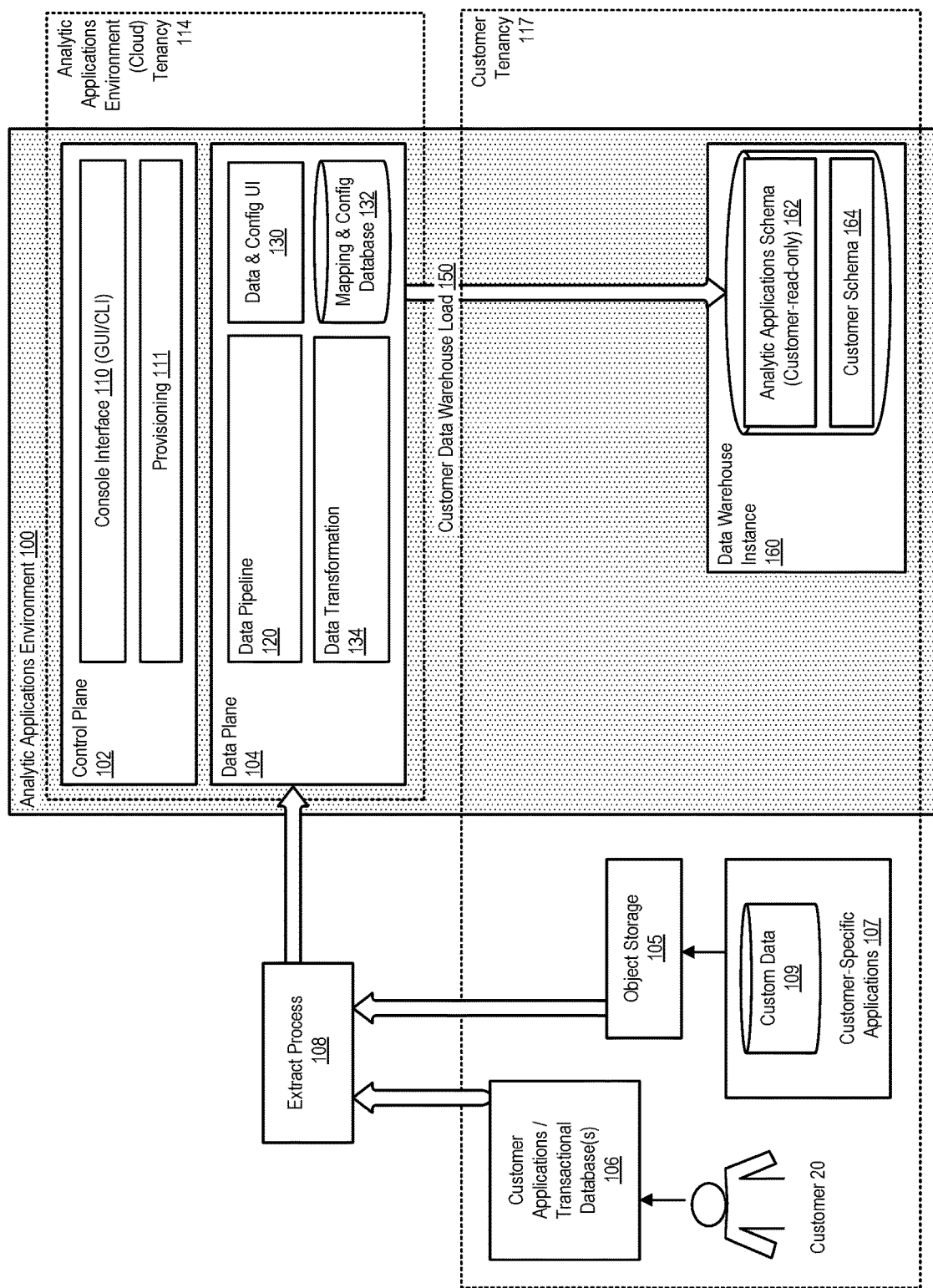
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
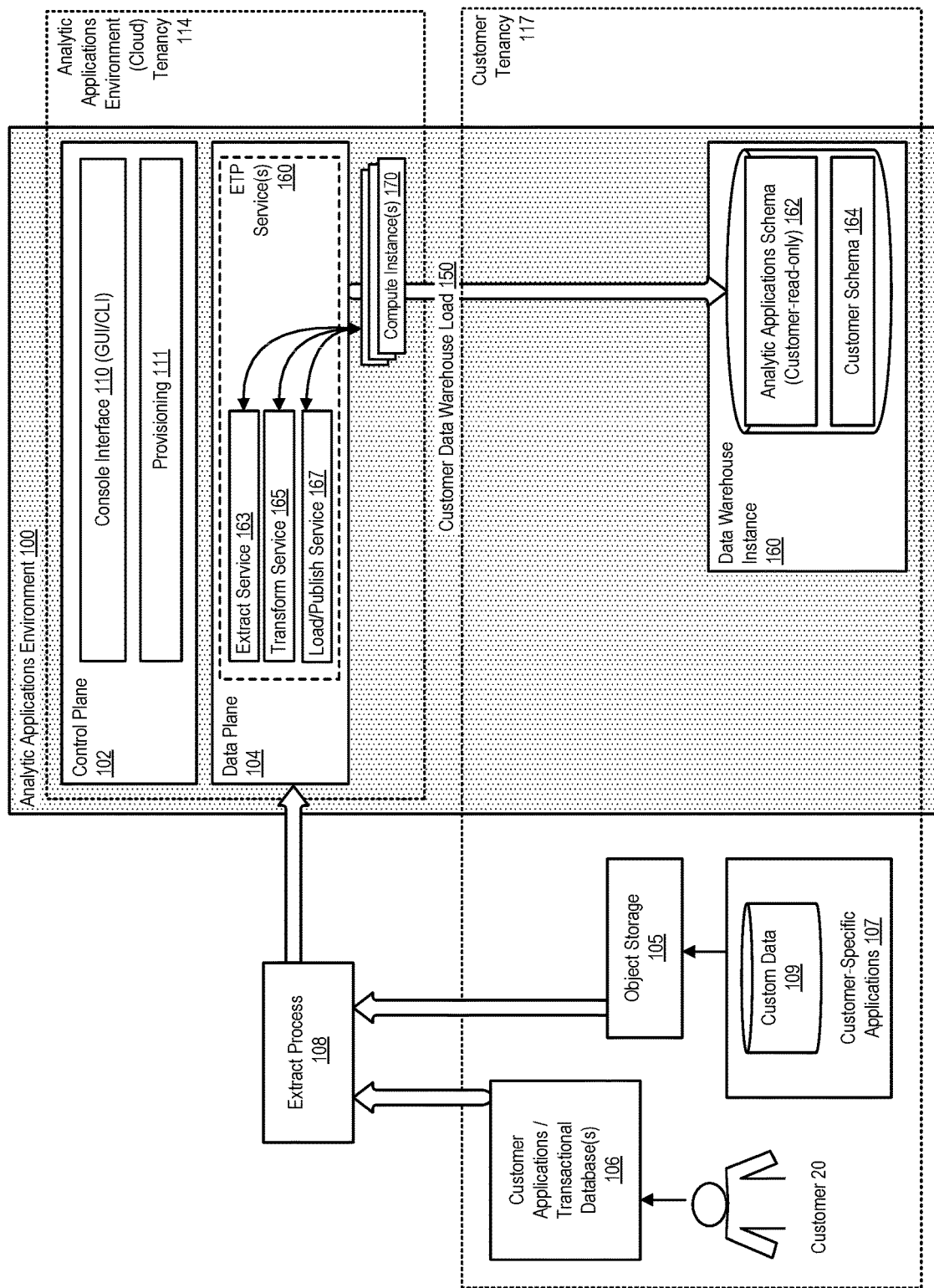
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., ADWC database, and publishes it to a data warehouse instance that is accessible to the customer (tenant).

Multiple Customers (Tenants)

Figure 4:
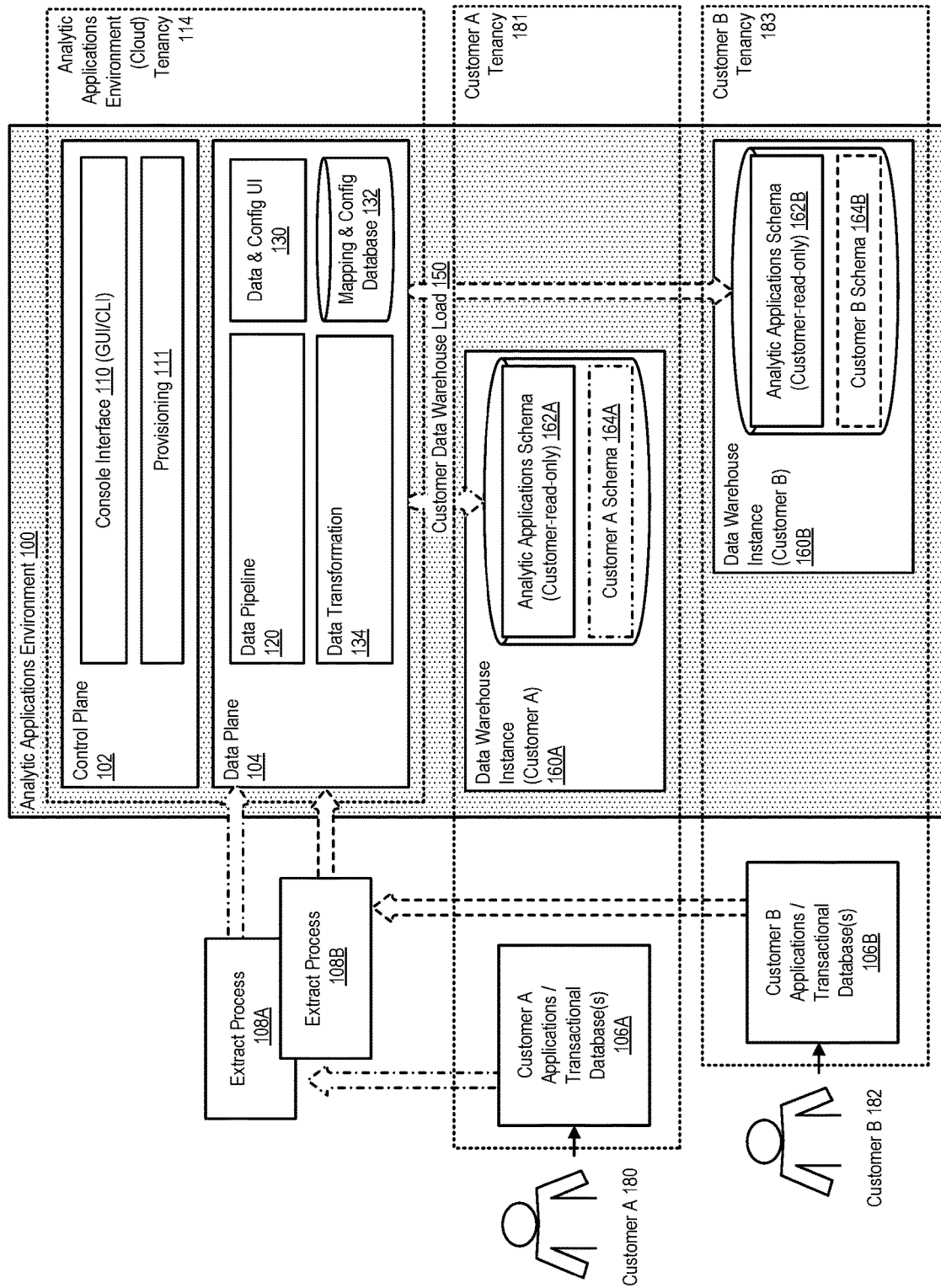
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
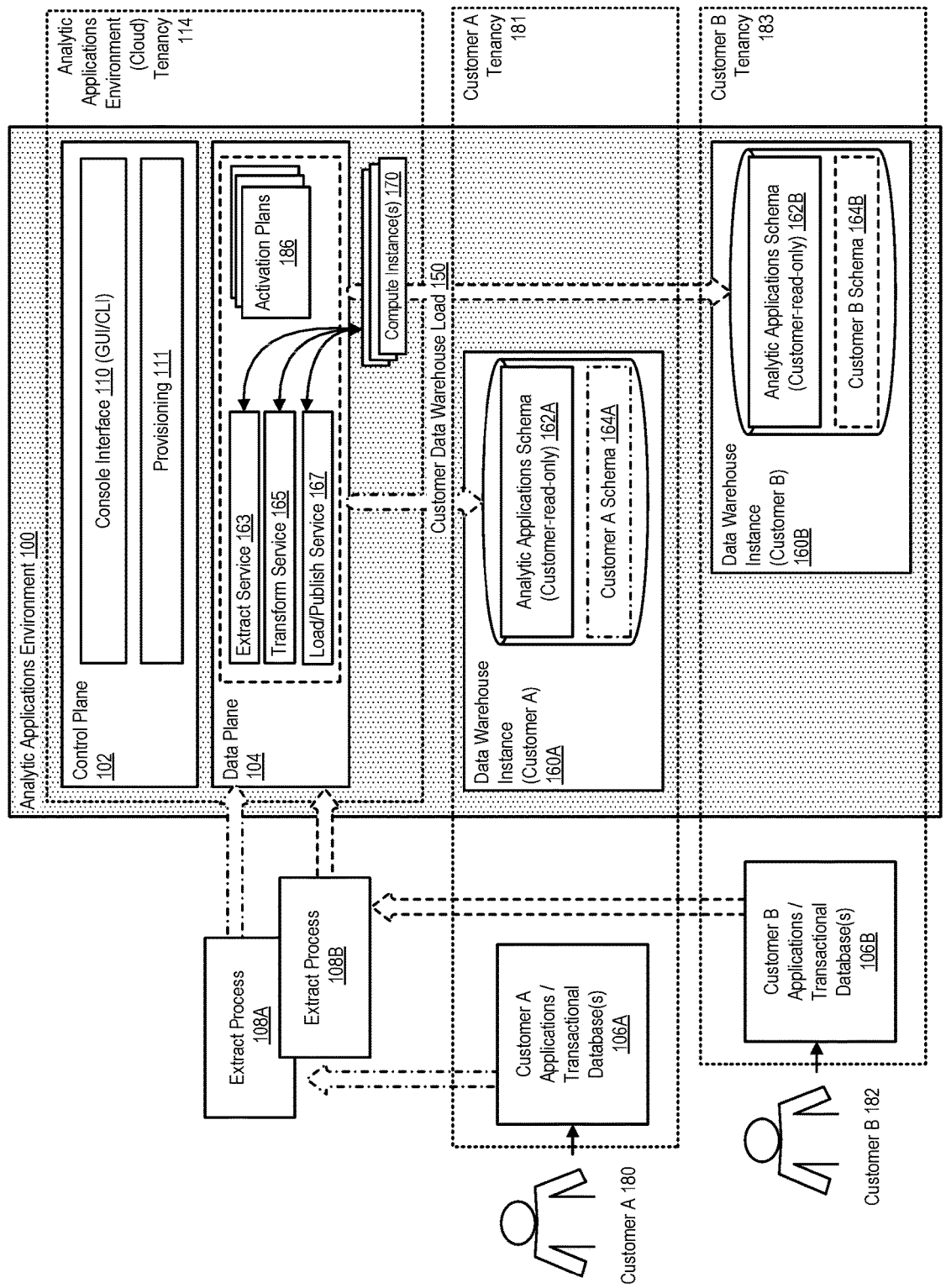
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VM's and service level agreements (SLA's) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETL processes) based upon historical data can be automatic.

ETL Process Flow

Figure 6:
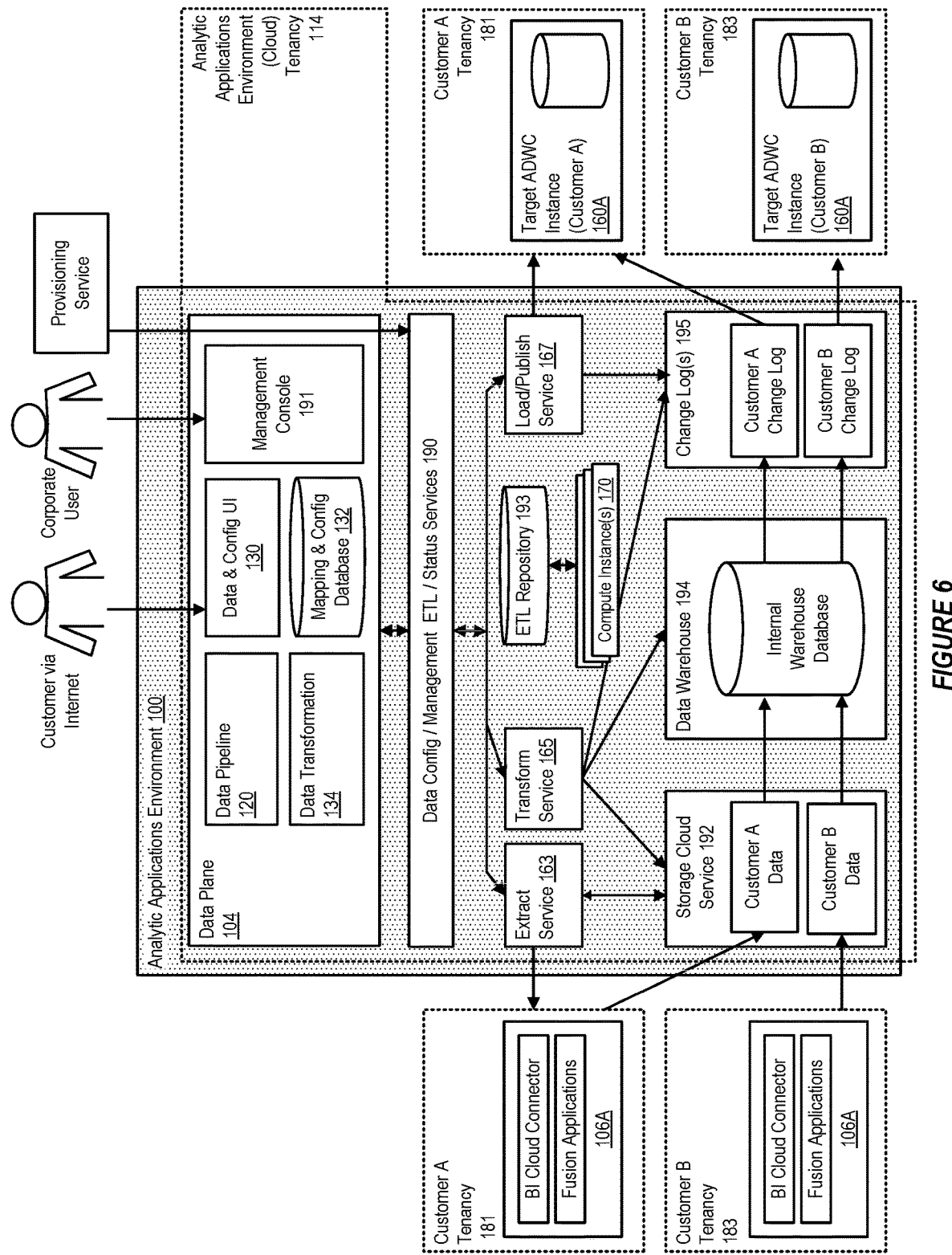
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETU/status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., ADWC) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
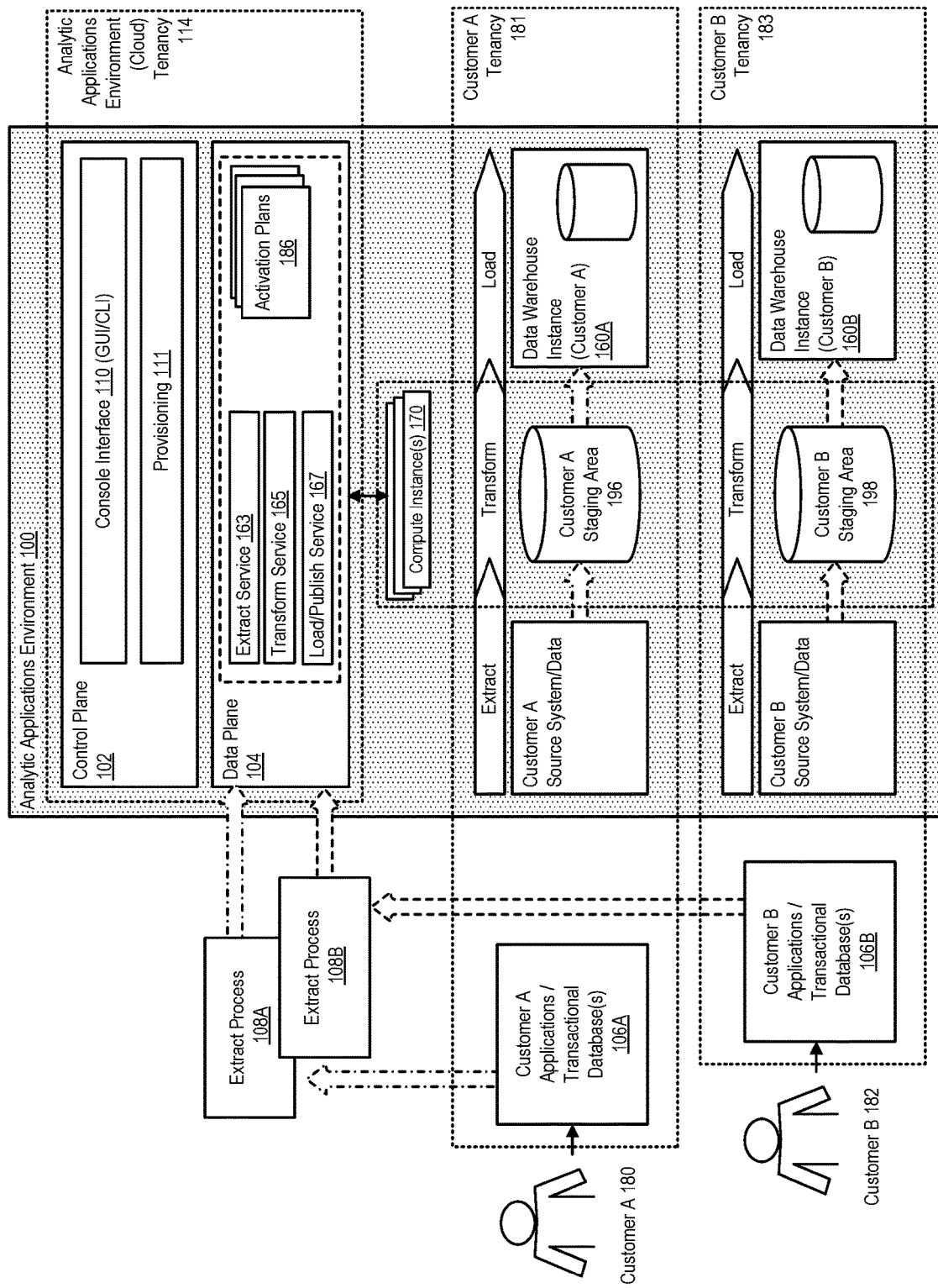
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
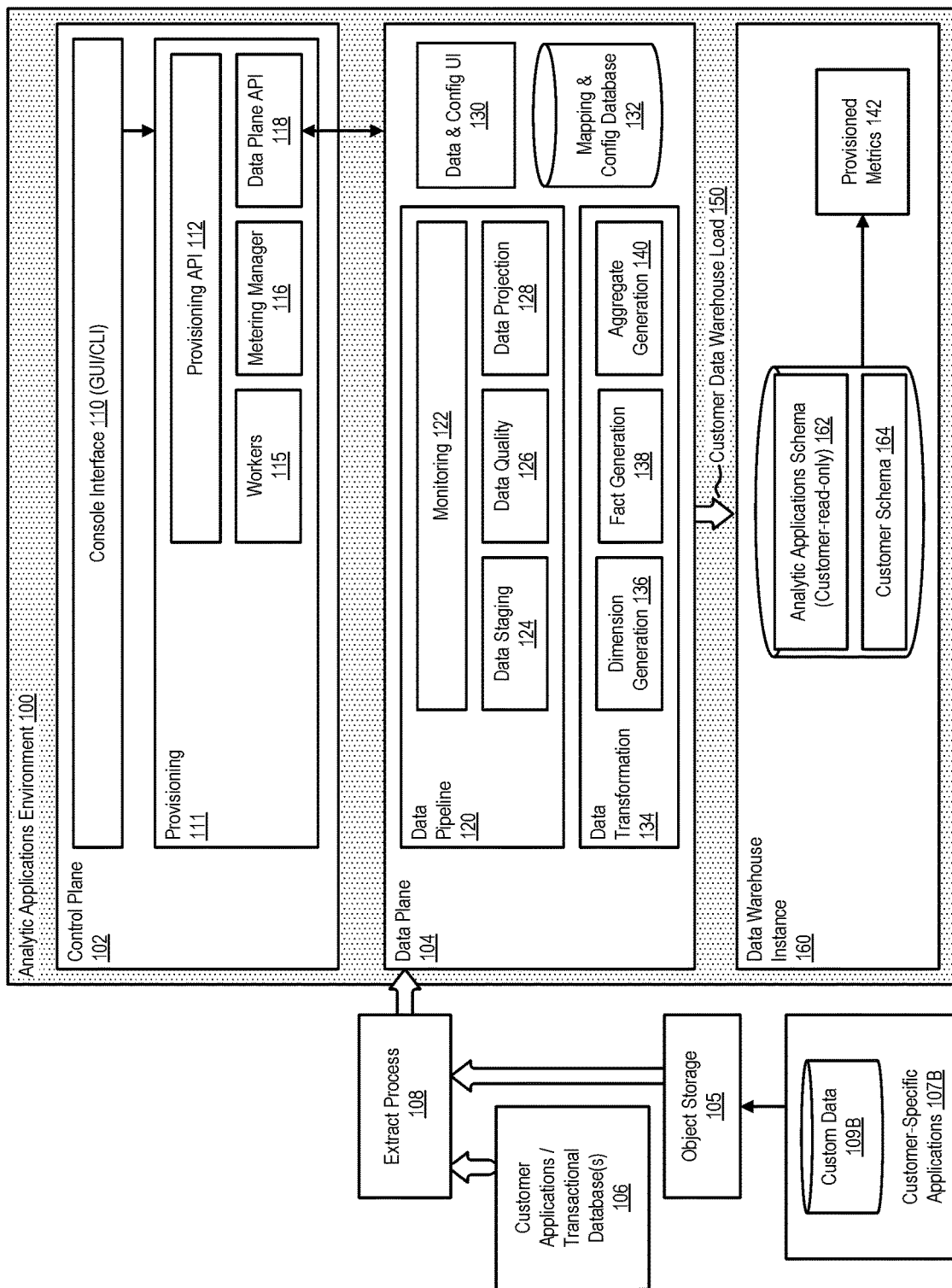
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
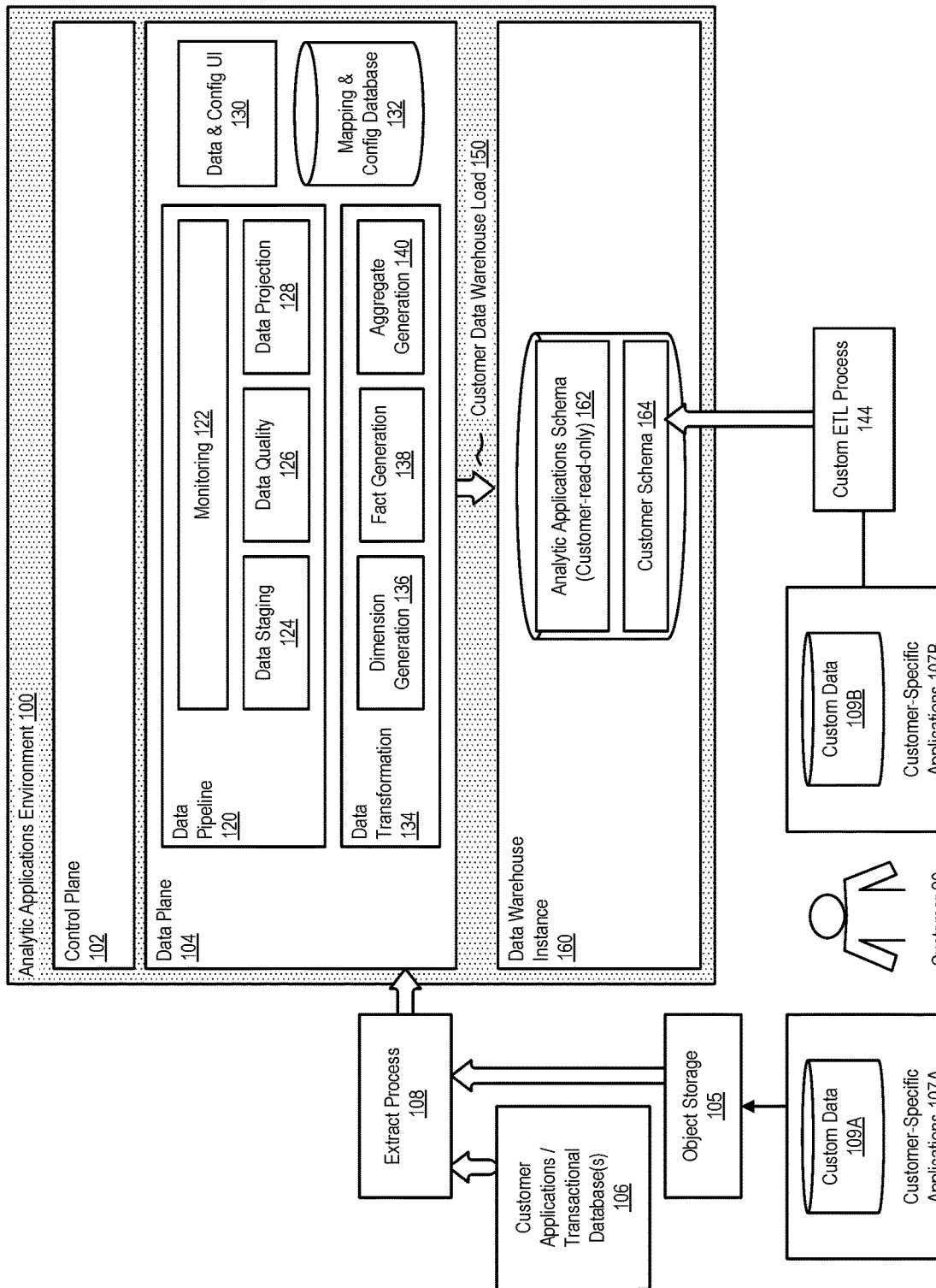
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
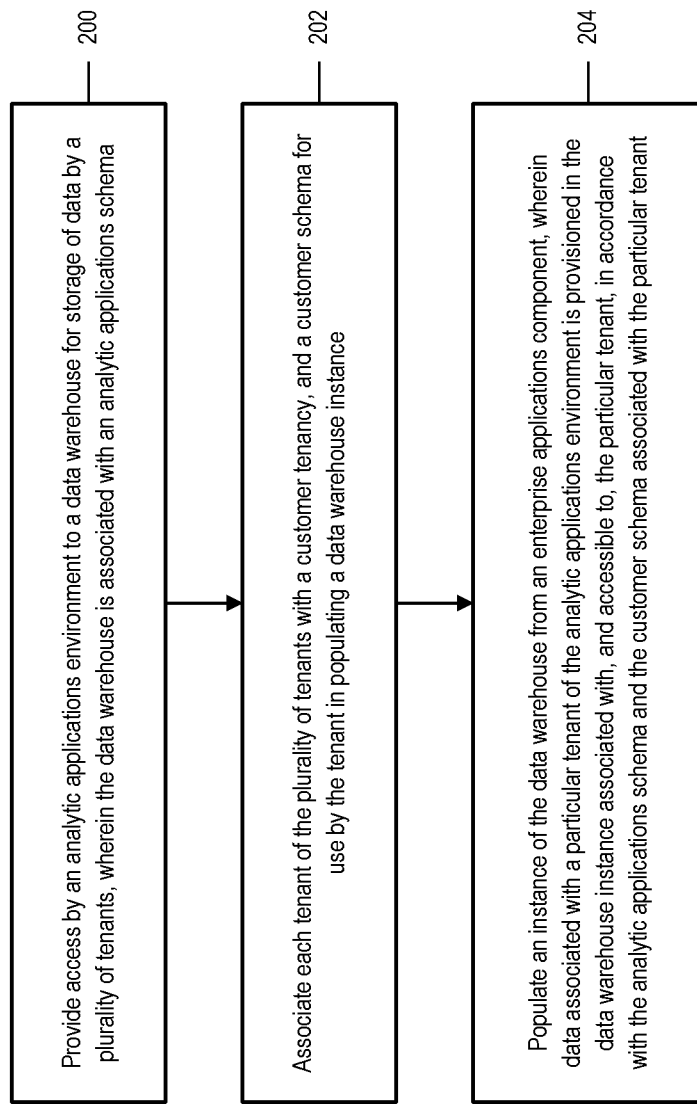
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Determination of Virtual Machines for Extract, Transform, Load (ETL)

In accordance with an embodiment, an ETL environment can include components that work together, such as, for example, an ETL repository that stores metadata such as information describing source tables, target warehouse tables, and transformations or mappings that will be used in an ETL process; and an ETL agent executable by an ETL server that orchestrates the ETL process.

Conventionally, where an ETL process is performed in a cloud environment, a separate compute instance or virtual machine may be provisioned for each customer, to act as an ETL server and perform the ETL process. The provisioned ETL server can then execute an ETL agent to extract the source data from the customer's source, and copy the data to a staging area, where transformations are carried out. Transformed data, reflecting the data model of the customer's data warehouse, can then be loaded into the customer's data warehouse instance.

Cloud-based computing environments and data warehouses can enable extract, transform, load (ETL) processes to be performed for multiple customers, using the shared resources of the cloud or data warehouse environment. In such environments, ETL processes may be associated with customer service level agreements (SLA's) specified for each different customer. However, since each customer's data growth may not be linear, or may grow rapidly within a relatively short period of time; it can be challenging to ensure that the processing time associated with their data remains within any specified SLA.

In accordance with an embodiment, described herein are systems and methods for determining or allocating an amount, quantity, or number of compute instances or virtual machines for use with extract, transform, load (ETL) processes. In an example embodiment, a particular (e.g., optimal) number of virtual machines (VM's) can be determined by predicting ETL completion times for customers, using historical data. ETL processes can be simulated with an initial/particular number of virtual machines. If the predicted duration is greater than the desired duration, the number of virtual machines can be incremented, and the simulation repeated. Actual completion times from ETL processes can be fed back, to update a determined number of compute instances or virtual machines. In accordance with an embodiment, the system can be used, for example, to generate alerts associated with customer service level agreements (SLA's).

Figure 11:
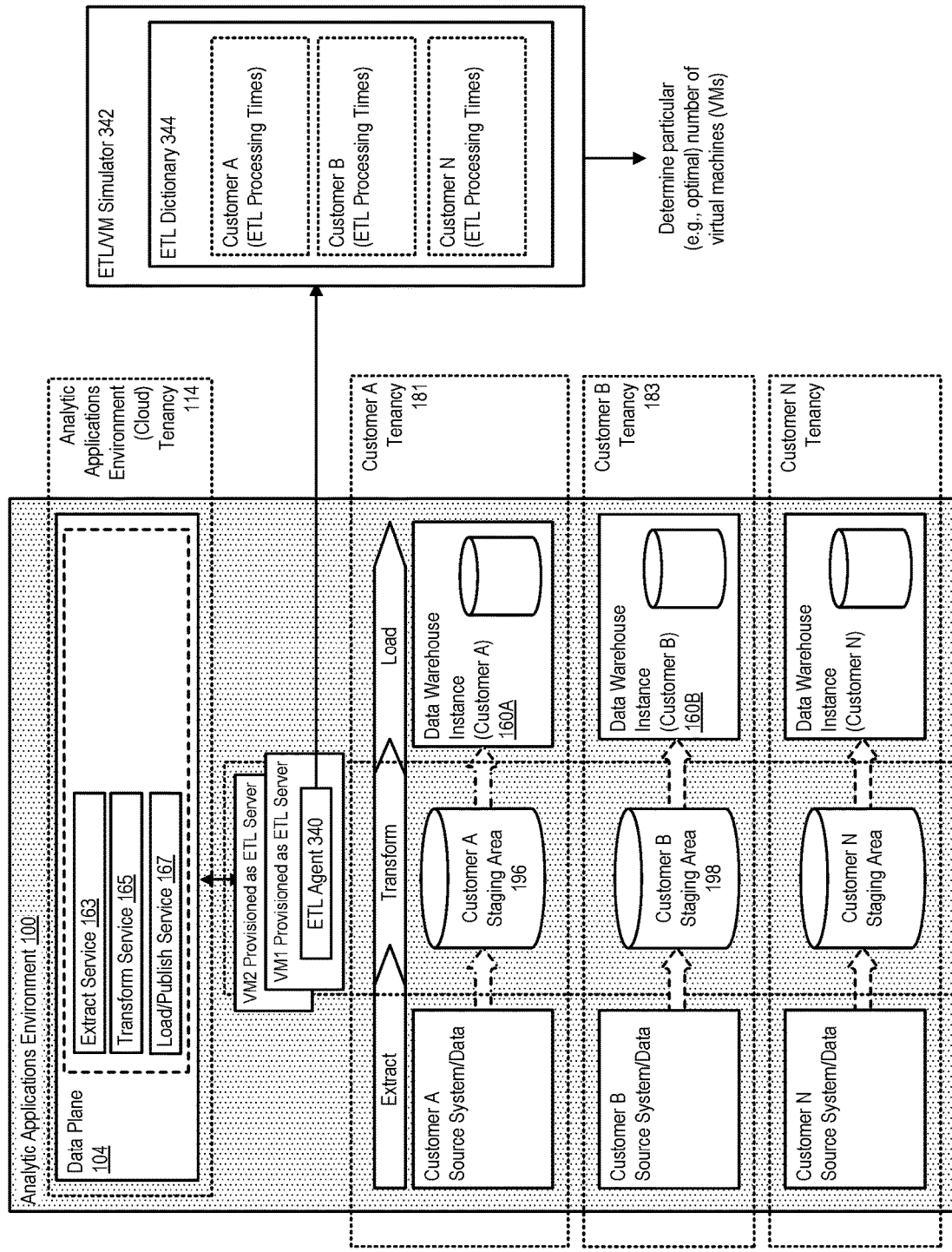
FIG. 11 illustrates a system for use with an analytic applications environment, for determining an amount, quantity, or number of compute instances or virtual machines for use with extract, transform, load processes, in accordance with an embodiment.

FIG. 11 illustrates a system for use with an analytic applications environment, for determining an amount, quantity, or number of compute instances or virtual machines for use with extract, transform, load processes, in accordance with an embodiment.

In accordance with an embodiment, a virtual machine simulator 340, provided by or in association with the system, can undertake several steps when determining a particular (e.g., optimal) number of ETL servers to provision. For example, in accordance with an embodiment, a first step can include predicting customer ETL processing times using customer historical data. This step can take into account, for example, a customer having different amounts of data on weekends or at peak times (such as month end, or quarter end), as well as seasonal trends.

In accordance with an embodiment, in another step, the predicted ETL processing times can be used to simulate customer ETL processes with an allocated amount, quantity, or number of compute instances or virtual machines provisioned as ETL servers that will be able to meet the SLA for those ETL processes.

For example, in accordance with an embodiment, if the desired goal is to run each customer's ETL processing in 3 hours, and the simulation indicates that each customer's ETL will likely take 4 hours, then more virtual machines can be provisioned and the simulation can be re-run. This step can be repeated until the simulation indicates that each customer's ETL processing will likely be completed within the desired 3-hour time limit.

In accordance with an embodiment, in another step, virtual machines can be provisioned, and customer ETL's can be processed, and the ETL running times can be monitored. The simulation of the ETL processes can be re-run after each customer's ETL is finished, and an actual ETL processing time is recorded. The virtual machine requirement can be updated, and the appropriate number of ETL servers can be similarly provisioned. This step can be repeated until all of the customers' ETL processes have been completed.

In accordance with an embodiment, after the ETL processing time for each customer's file is predicted, the information can be used to perform a queueing simulation of the expected time for running the ETL processes for a plurality or all of the customers.

For example, in accordance with an embodiment, the process can start with an initial amount, quantity, or number of ETL virtual machines. The simulation can then determine the predicted duration of the ETL processing time for all customers. If the predicted duration is less than a desired duration, then the process can output the number of compute instances or virtual machines. Otherwise the number of compute instances or virtual machines can be incremented, and the simulation be re-run with the incremented number of compute instances or virtual machines; and the process repeated until the predicted duration is less than or equal to the desired duration.

ETL Agents

In accordance with an embodiment, one or more ETL agents 340 can provide useful data or metrics for an ETL run. For example, an ETL agent can record a target table name (for example, the data warehouse table name), an incremental row count (for example, how many rows were added to the data warehouse table), an extract time, a transform time, a load time, a start time (of an ETL run), and/or an end time (of the ETL run).

Using the above metrics, the system can predict ETL processing times in various ways, and then determine an average, to compute the predicted ETL processing time. For example, the extract, transform, load time for each target file (for example, each customer's ETL data set), can be modeled, and the predicted ETL processing time computed as the sum of the predicted ETL processing times for all files.

In another example, an aggregate ETL processing time (for example, an end time minus a start time) can be predicted directly for each target file, and then the total ETL processing time can be computed as a sum of the aggregate ETL processing times. In another example, the total ETL processing time can be directly predicted for all customer ETL files.

In accordance with an embodiment, and example of the predicted variable can include the elapsed time, and an example of the input variable can include the incremental row count or incremental data size. The system can determine predictions using, for example, regression models, or other models such as random forest regressors or neural networks. In accordance with various embodiments, a combination of prediction methods can be used, and then averaged to determine the predicted ETL processing time for completion of the ETL.

In accordance with an embodiment, an output of this prediction step can be a dictionary 344, of customer names and the predicted ETL processing times for each customer's data file, such as, for example, in the form of (Cust1:time1, Cust2:time2, . . . ,CustN:timeN).

Prediction of ETL Processing Times

Figure 12:
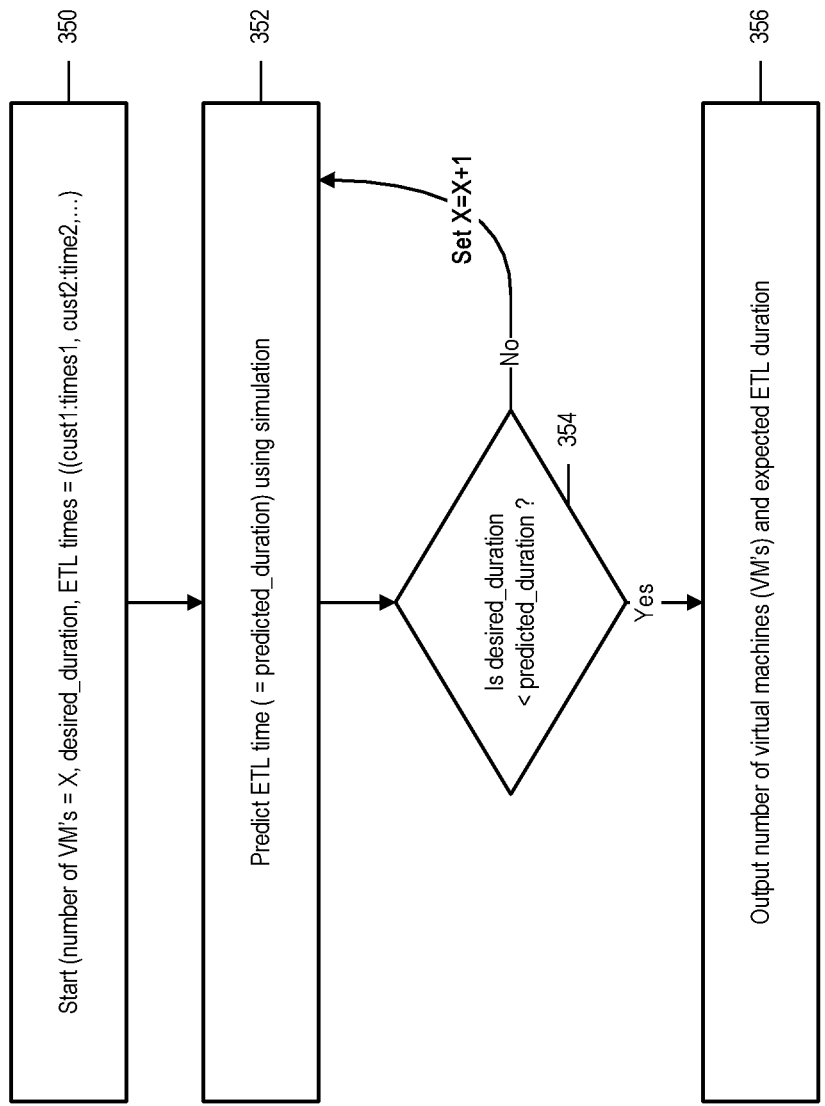
FIG. 12 illustrates a flowchart of a method for determining an amount, quantity, or number of compute instances or virtual machines for use with extract, transform, load processes, in accordance with an embodiment.

FIG. 12 illustrates a flowchart of a method for determining an amount, quantity, or number of compute instances or virtual machines for use with extract, transform, load processes, in accordance with an embodiment.

As illustrated in FIG. 12, in accordance with an embodiment, at step 350, information describing the ETL processing time for each customer's file can be used, by the system, to perform a queueing simulation of the expected time for running the ETL for a plurality or all of the customers, starting with an initial number of virtual machines (for example, as a number of ETL virtual machines=X).

At step 352, using X number of ETL virtual machines, the system can perform a simulation to determine the predicted duration of the ETL for all customers.

At step 354, if the system determines that the predicted duration is less than a desired duration, then the process can output X (for example, the number of virtual machines). Otherwise, the values for X can be incremented and the simulation can be re-run with, for example, X+1 ETL virtual machines.

At step 356, the above steps (352-354) can be repeated by the system until the predicted duration is less than or equal to the desired duration.

Dynamic Updating of Virtual Machine Requirements

In accordance with an embodiment, the above approach can be used to compute a static requirement for ETL compute instances or virtual machines, including simulating a predicted duration. Since in practice the actual ETL processing times for each customer may change because of various factors; in accordance with an embodiment, in determining a particular (e.g., optimal) number of compute instances or virtual machines, the method can include updating the number of compute instances or virtual machines required, based on receipt of actual completion times for those customers whose ETL processing has completed.

Example Simulation

In accordance with an embodiment, an example output or result of simulating varying a number of compute instances or virtual machines for performing an ETL process is illustrated in Table 1. In the illustrated example, the simulation includes 800 customers, and assumes that all jobs are ready to be scheduled at the start of simulation, and can be scheduled in batch mode; all of the virtual machines are similar and only the job execution times vary; and the ETL processing times are uniformly distributed between 2-5 hours. Customer arrivals are known ahead of time, because of the need to schedule the ETL.

TABLE 1

| Number of Virtual Machines | Average Wait Times (Hours) |
|---|---|
| 50 | 25.77 |
| 100 | 12.00 |
| 200 | 5.13 |

In the illustrated example, the average predicted wait times provided by the simulation varies with the number of virtual machines, including that, for example, using 200 virtual machines, the average predicted wait time is 5.13 hours.

SLA Auditor

In accordance with an embodiment, the system or methods described above can be implemented as part of, or in association with, an SLA auditor component or process, that can operate, for example, to receive historical table sizes; forecast a table size for a current day (as a time series), and the running time for a tenant (for example, using regression); and use the simulation either to predict a number of virtual machines required; and/or provide other functionality such as, for example, provide an alert if particular ETL times are expected to be high.

Figure 13:
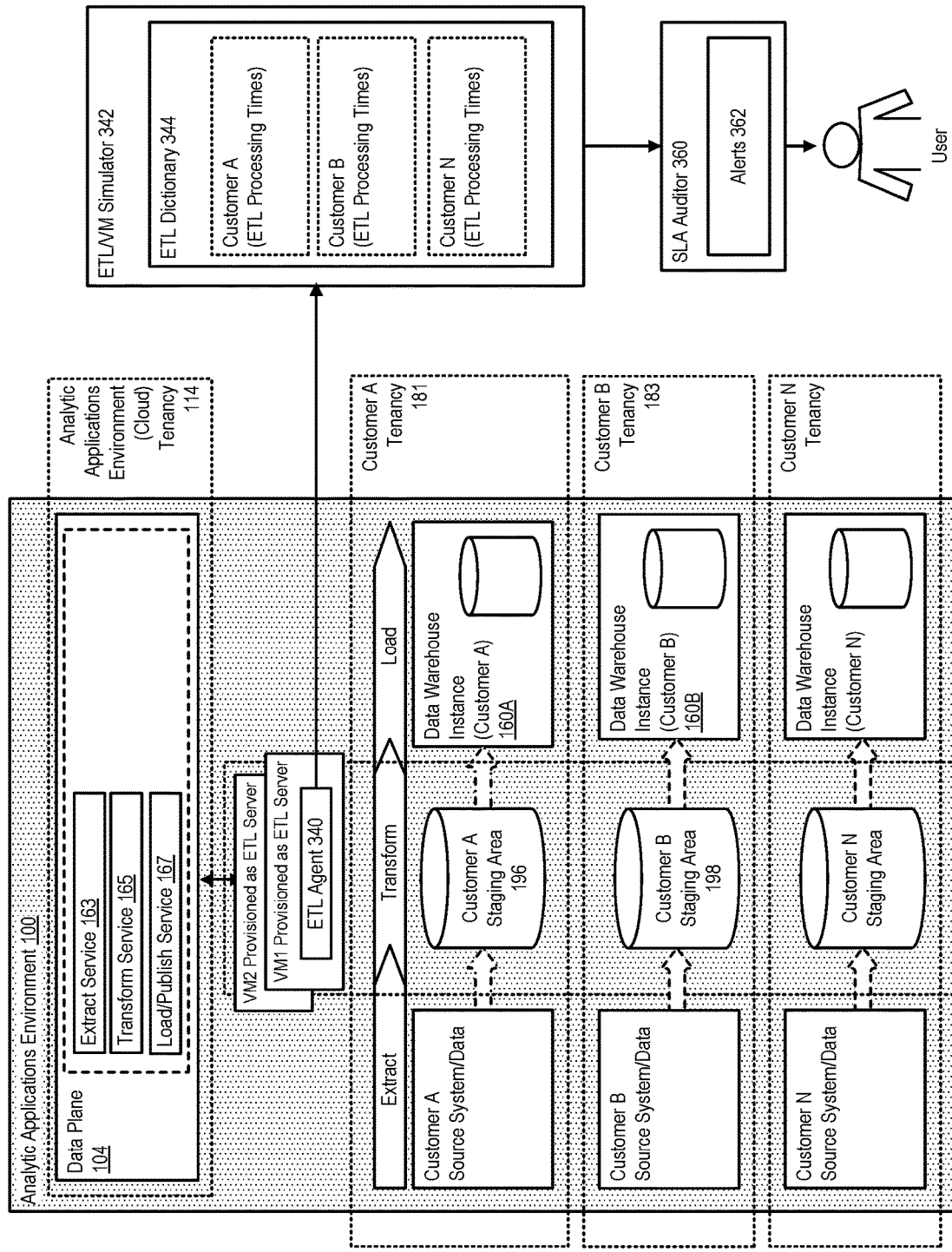
FIG. 13 further illustrates a system for determining an amount, quantity, or number of compute instances or virtual machines for use with extract, transform, load processes, including use of an SLA auditor, in accordance with an embodiment.

FIG. 13 further illustrates a system for determining an amount, quantity, or number of compute instances or virtual machines for use with extract, transform, load processes, including use of an SLA auditor, in accordance with an embodiment.

As illustrated in FIG. 13, in accordance with an embodiment, the SLA auditor 360 component or process enables prediction of ETL job completion times for individual tenants based on past history, and can provide communication of appropriate alerts 362.

For example, in accordance with an embodiment, given a number of tenants for scheduling, and a number of compute resources, the system can be used to predict start and end times for various tenant ETL processes, and can communicate an alert if, for example, it determines an ETL job running time for a current job is beyond a preset threshold (for example 10 minutes); or if predicted start/end times are beyond a particular percentage (X%) of desired times.

Figure 14:
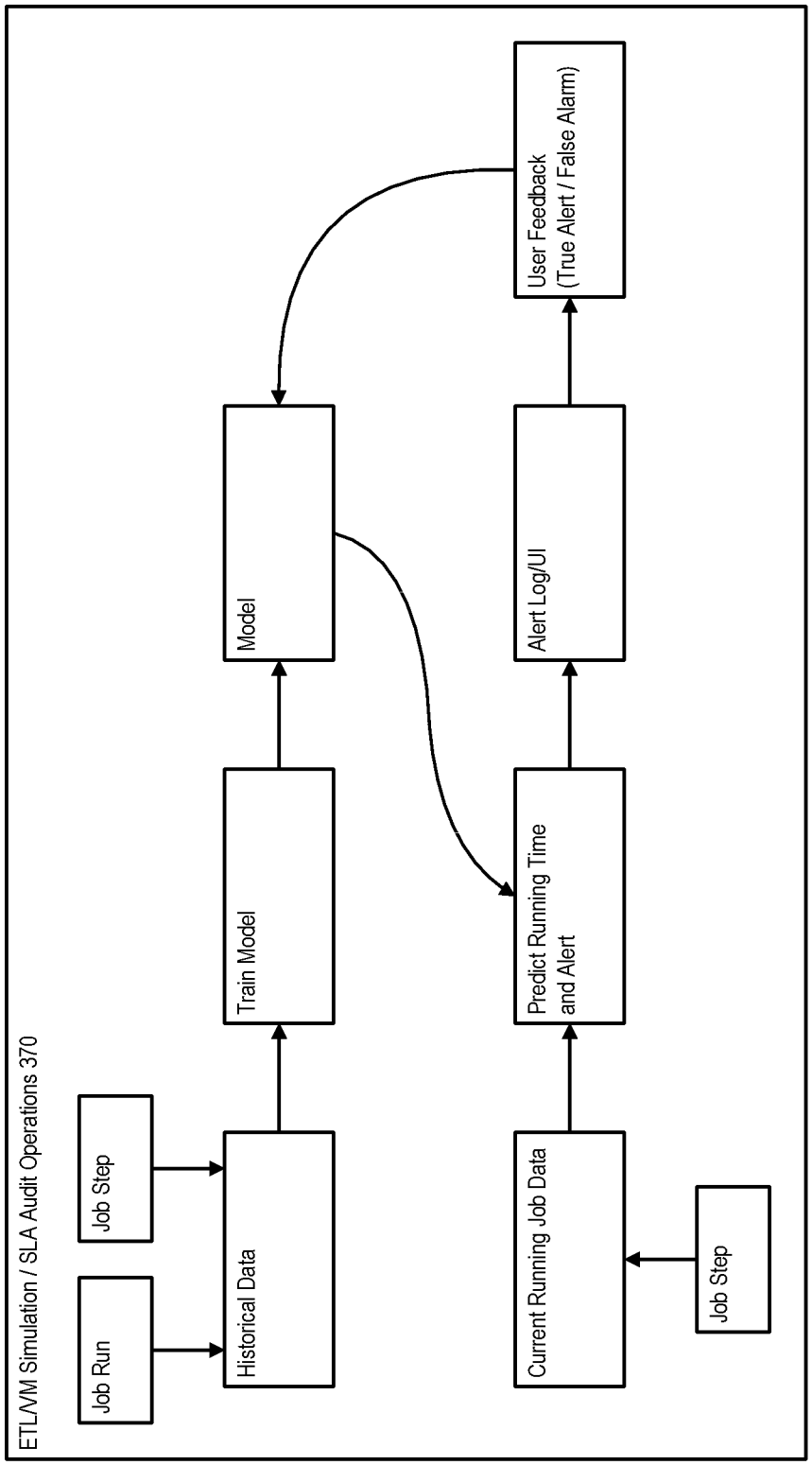
FIG. 14 illustrates example virtual machine simulation and service level agreement audit operations, in accordance with an embodiment.

FIG. 14 illustrates example virtual machine simulation and service level agreement audit operations 370, in accordance with an embodiment; while Listing 1 illustrates an example job completion prediction and alert pseudocode or algorithm, in accordance with an embodiment, wherein, for example, a delta defines a monitoring interval (for example, every 5 minutes); and a threshold defines an interval above a prediction completion time, by which the system should provide an alert (for example, 10 minutes).

Listing 1

```
Job_completion_predict_and_alert(tenant,model,delta,threshold)
{
    T0 = Predict_job_completion_time(historical_data,model)
    while (not job_completed)
    {
        D = current job data
        T1 = Predict_job_completion_time(D,model)
```

Listing 1 -continued

```
        // Includes updates based on step data
        T2 = now
            diff = T2−T1
        if(diff > threshold)
            alert("Job for tenant delayed")
            sleep(delta)
    }
    // Exit from while loop => job completed
    T3 = job_completion_time
    log(T0,T3,T0-T3) // Log under predict/over predict
}
```

In accordance with an embodiment, a particular ETL processing time can depend on a variety of factors, such as, for example, infrastructure factors (e.g., CPU, Network latency, I/O latency, or encryption), which can be assumed the same for all jobs and generally ignored; software factors (e.g., HRF transformations applied), which can also generally be ignored; and data factors (e.g., size of incremental view objects, or a number of tables used by a job), which can be extracted from the job data, and used by the system in preparing predictions.

In accordance with an embodiment, the SLA auditor can consider additional factors such as, for example, a tenant id and running time for job (from job run); a job step name (data extraction, transformation, publish) and running times for each (from job_step); a date and time of running job; a sine and cosine of day of week, time of day, day of month, month of year; (Weekday, Is_Weekend for date); a running time of a job the last several (e.g., three) times; average running times (e.g., last two times, last three times, all); and/or can filter out data, for example, for a complete (non-incremental) run; or a trivial run (less or no data).

Figure 15:
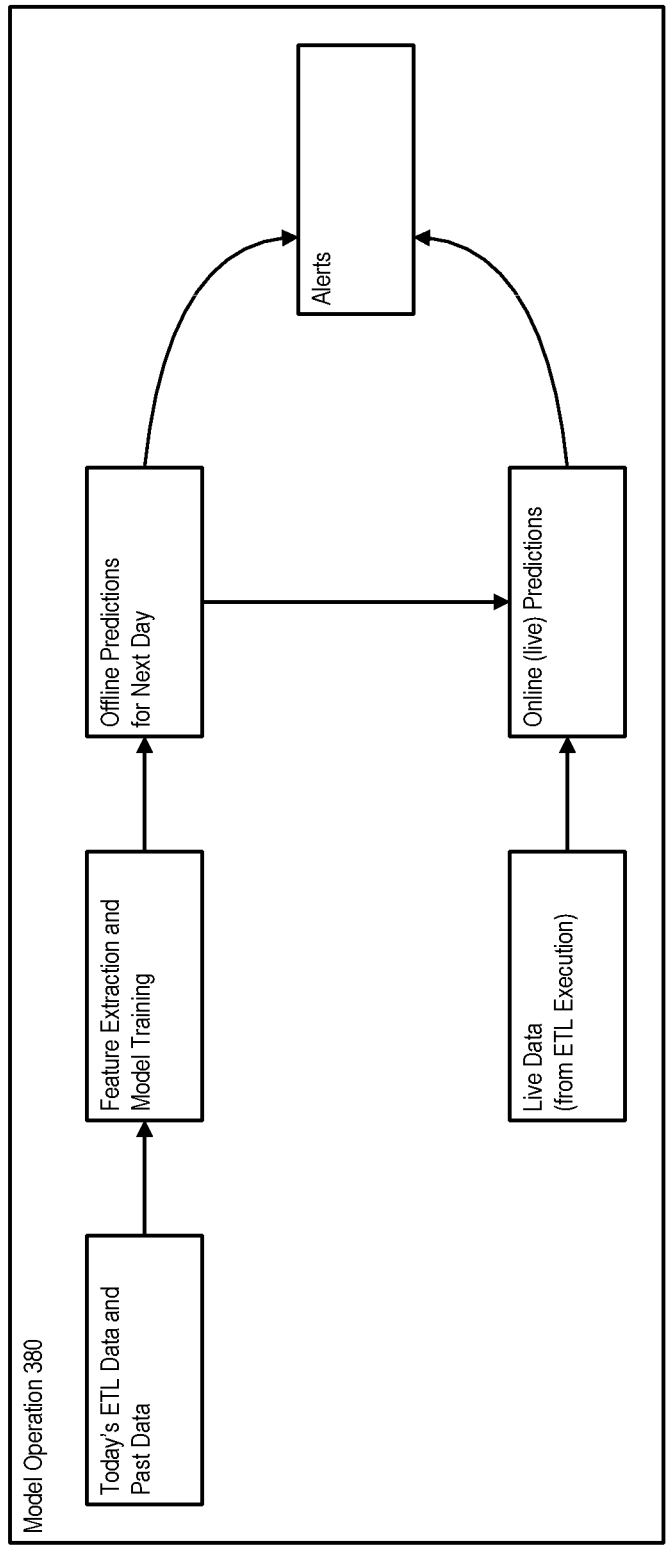
FIG. 15 illustrates an example model operation, in accordance with an embodiment.

FIG. 15 illustrates an example model operation 380, in accordance with an embodiment, while Listing 2 and Listing 3 illustrate examples of next day prediction, and same day prediction, pseudocodes or algorithms, in accordance with an embodiment.

Listing 2

```
Next_day_prediction(historical data till date)
{
predict ETL sizes as a time series(e.g. using FB prophet)
predict ETL processing times+total time as time series
predict ETL processing times as regression
# Output ETL processing time as average of predictions (time series, regression)
Alerts( )
}
```

Listing 3

```
Same_day_prediction(regression model,live data)
{
retrieve data sizes as job stages complete
predict remaining data sizes using regression
predict ETL processing time interval using regression
Alerts( )
}
```

In accordance with an embodiment, the model can be used by the system, for example, to offline predict run times for an overall job, or for each step (extract, transform, publish) for the day; fetch actual times based on step completion times during the run, and update predictions; and determine an alert based on updated predictions. An under/over prediction approach can use, as a baseline, an average of the last two runs. Examples of predictive variables can include, for example, extract_files_processed; transform_full_records_read; transform_full_records_rejected; transform_incre_records_read; transform_total_records_read; transform_total_records_rejected; publish_records_run, publish_records_rejected, or date/time features.

The above examples of various features, such as predictive variables and other model considerations, are provided by way of example, to illustrate various embodiments; in accordance with other embodiments, other types of predictive variables and other model considerations can be used.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments. Additionally, while several of the examples provided herein illustrate determining a number of virtual machines, embodiments can be used to determine a number of other types of compute instances, for use with for use with other types of extract, transform, load or other data pipeline processes.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with an analytic applications environment, for determining a number of compute instances or virtual machines for use with at least one of an extract, transform, load or other data pipeline process, comprising:
a computer including one or more processors, that provides access by an analytic applications environment to a data warehouse for storage of data by a plurality of tenants;
a data warehouse instance associated with each tenant, including a first data warehouse instance associated with a first tenant, and a second data warehouse instance associated with a second tenant; and
an analytics schema associated with each data warehouse instance, that enables data to be loaded automatically, by a data pipeline or other processing component, to a particular data warehouse instance in accordance with the analytics schema, to pre-populate the data warehouse instance with business intelligence or analytics data retrieved from an associated tenant enterprise application or database environment;
wherein each tenant and data warehouse instance is additionally associated with a customer schema, including:
a first customer schema associated with a first tenant and first data warehouse instance; and
a second customer schema associated with a second tenant and second data warehouse instance;
wherein a data pipeline or other processing component performs at least one of an extract, transform, load or other data pipeline process to extract data from an enterprise application or database environment, to be loaded into a data warehouse;
wherein contents of the particular data warehouse instance are controlled by the data pipeline or other processing component operating automatically in accordance with the analytics schema, and by the customer schema associated with the particular data warehouse instance;
wherein the system determines, for an amount of tenant data to be loaded into the data warehouse, a predicted processing time or duration based on a historical data indicative of historical extract, transform, load or other processing times for various amounts of tenant data; and
upon the determination of the predicted processing time or duration, determines or allocates an amount, quantity, or number of compute instances or virtual machines to perform the extract, transform, load or other process with the amount of tenant data to be loaded into the data warehouse.

2. The system of claim 1, wherein the amount, quantity, or number of compute instances or virtual machines allocated to perform the extract, transform, load or other process with the amount of tenant data to be loaded into the data warehouse is determined by performing a simulation of the processing time or duration for the amount of tenant data.

3. The system of claim 2, wherein the simulation of the processing time or duration for the amount of tenant data is performed initially with a baseline number of compute instances or virtual machines, to predict the processing time or duration; and the number of compute instances or virtual machines incremented in response to the predicted processing time or duration being greater than a configured threshold time.

4. The system of claim 3, wherein the extract, transform, load or other process for the determined amount of tenant data is performed on the incremented number of compute instances or virtual machines.

5. The system of claim 2, wherein the simulation of the processing time or duration for the amount of tenant data is used to predict a total processing duration for a plurality of tenants, and wherein if the predicted total processing duration is greater than a desired duration, then the number of compute instances or virtual machines is incremented, and the simulation re-run until the predicted total processing duration is less than or equal to the desired duration.

6. The system of claim 1, wherein the amount, quantity, or number of compute instances or virtual machines allocated to perform the extract, transform, load or other process with the amount of tenant data is dynamically updated in response to a determination of completion times for one or more tenants for which the extract, transform, load or other process has completed loading of their data.

7. The system of claim 1, further comprising generating of a list of tenant (customer) names and predicted processing time or duration for each amount of tenant data to be loaded into the data warehouse.

8. The system of claim 1, further comprising predicting processing time or durations based at least partly on one or more of:
a tenant (customer) historical data, including different amounts of data at various times of day, month, or year; or
a tenant (customer) service legal agreement (SLA) associated with use of the extract, transform, load or other process to load their tenant data into the data warehouse.

9. The system of claim 1, wherein the computer environment maintains, for a plurality of tenants (customers) of the environment:
a data warehouse instance associated with each tenant, including a first data warehouse instance associated with a first tenant, and a second data warehouse instance associated with a second tenant; and
an analytics schema associated with each data warehouse instance, that enables data to be loaded automatically, by the data pipeline or other processing component, to a particular data warehouse instance in accordance with the analytics schema, to pre-populate the data warehouse instance with business intelligence or analytics data retrieved from an associated tenant enterprise application or database environment.

10. A method for use with an analytic applications environment, for determining a number of compute instances or virtual machines for use with at least one of an extract, transform, load or other data pipeline process, comprising:
providing, at a computer including one or more processors, access by an analytic applications environment to a data warehouse for storage of data by a plurality of tenants;
associating a data warehouse instance with each tenant, including a first data warehouse instance associated with a first tenant, and a second data warehouse instance associated with a second tenant;
associating with each data warehouse instance an analytics schema that enables data to be loaded automatically, by a data pipeline or other processing component, to a particular data warehouse instance in accordance with the analytics schema, to pre-populate the data warehouse instance with business intelligence or analytics data retrieved from an associated tenant enterprise application or database environment;
wherein each tenant and data warehouse instance is additionally associated with a customer schema, including:

a first customer schema associated with a first tenant and first data warehouse instance; and a second customer schema associated with a second tenant and second data warehouse instance;

wherein a data pipeline or other processing component performs at least one of an extract, transform, load or other data pipeline process to extract data from an enterprise application or database environment, to be loaded into a data warehouse;

wherein contents of the particular data warehouse instance are controlled by the data pipeline or other processing component operating automatically in accordance with the analytics schema, and by the customer schema associated with the particular data warehouse instance;

determining, for an amount of tenant data to be loaded into the data warehouse, a predicted processing time or duration based on a historical data indicative of historical extract, transform, load or other processing times for various amounts of tenant data; and upon the determination of the predicted processing time or duration, determining or allocating an amount, quantity, or number of compute instances or virtual machines to perform the extract, transform, load or other process with the amount of tenant data to be loaded into the data warehouse.

11. The method of claim 10, wherein the amount, quantity, or number of compute instances or virtual machines allocated to perform the extract, transform, load or other process with the amount of tenant data to be loaded into the data warehouse is determined by performing a simulation of the processing time or duration for the amount of tenant data.

12. The method of claim 11, wherein the simulation of the processing time or duration for the amount of tenant data is performed initially with a baseline number of compute instances or virtual machines, to predict the processing time or duration; and the number of compute instances or virtual machines incremented in response to the predicted processing time or duration being greater than a configured threshold time; wherein the extract, transform, load or other process for the determined amount of tenant data is performed on the incremented number of compute instances or virtual machines.

13. The method of claim 11, wherein the simulation of the processing time or duration for the amount of tenant data is used to predict a total processing duration for a plurality of tenants, and wherein if the predicted total processing duration is greater than a desired duration, then the number of compute instances or virtual machines is incremented, and the simulation re-run until the predicted total processing duration is less than or equal to the desired duration.

14. The method of claim 10, wherein the amount, quantity, or number of compute instances or virtual machines allocated to perform the extract, transform, load or other process with the amount of tenant data is dynamically updated in response to a determination of completion times for one or more tenants for which the extract, transform, load or other process has completed loading of their data.

15. The method of claim 10, further comprising generating of a list of tenant (customer) names and predicted processing time or duration for each amount of tenant data to be loaded into the data warehouse.

16. The method of claim 10, further comprising predicting processing time or durations based at least partly on one or more of:

a tenant (customer) historical data, including different amounts of data at various times of day, month, or year; or a tenant (customer) service legal agreement (SLA) associated with use of the extract, transform, load or other process to load their tenant data into the data warehouse.

17. The method of claim 10, wherein the computer environment maintains, for a plurality of tenants (customers) of the environment:

a data warehouse instance associated with each tenant, including a first data warehouse instance associated with a first tenant, and a second data warehouse instance associated with a second tenant; and an analytics schema associated with each data warehouse instance, that enables data to be loaded automatically, by the data pipeline or other processing component, to a particular data warehouse instance in accordance with the analytics schema, to pre-populate the data warehouse instance with business intelligence or analytics data retrieved from an associated tenant enterprise application or database environment.

18. A non-transitory computer readable storage medium having instructions thereon, which when read and executed by a computer including one or more processors cause the computer to perform a method comprising:

providing, at a computer including one or more processors, access by an analytic applications environment to a data warehouse for storage of data by a plurality of tenants;

associating a data warehouse instance with each tenant, including a first data warehouse instance associated with a first tenant, and a second data warehouse instance associated with a second tenant;

associating with each data warehouse instance an analytics schema that enables data to be loaded automatically, by a data pipeline or other processing component, to a particular data warehouse instance in accordance with the analytics schema, to pre-populate the data warehouse instance with business intelligence or analytics data retrieved from an associated tenant enterprise application or database environment;

wherein each tenant and data warehouse instance is additionally associated with a customer schema, including:

a first customer schema associated with a first tenant and first data warehouse instance; and a second customer schema associated with a second tenant and second data warehouse instance;

wherein a data pipeline or other processing component performs at least one of an extract, transform, load or other data pipeline process to extract data from an enterprise application or database environment, to be loaded into a data warehouse;

wherein contents of the particular data warehouse instance are controlled by the data pipeline or other processing component operating automatically in accordance with the analytics schema, and by the customer schema associated with the particular data warehouse instance;

determining, for an amount of tenant data to be loaded into the data warehouse, a predicted processing time or duration based on a historical data indicative of historical extract, transform, load or other processing times for various amounts of tenant data; and upon the determination of the predicted processing time or duration, determining or allocating an amount, quantity, or number of compute instances or virtual machines to perform the extract, transform, load or other process with the amount of tenant data to be loaded into the data warehouse.

\* \* \* \* \*

UNITED STATES PATENT AND TRADEMARK OFFICE
CERTIFICATE OF CORRECTION

| | |
|---|---|
| PATENT NO. | : 11,614,976 B2 |
| APPLICATION NO. | : 16/853428 |
| DATED | : March 28, 2023 |
| INVENTOR(S) | : Ramanathan et al. |

It is certified that error appears in the above-identified patent and that said Letters Patent is hereby corrected as shown below:

On the Title Page

On page 2, Column 2, item (56) under Other Publications, Line 18, delete "Startegy" and insert -- Strategy --, therefor.

In the Specification

In Column 1, Line 60, delete "ENVIRONMENT" and insert -- ENVIRONMENT", application --, therefor.

In Column 5, Line 19, delete "organization," and insert -- organization. --, therefor.

In Column 10, Line 57, delete "analytics" and insert -- analytics. --, therefor.

In Column 10, Line 59, delete "Warehouse," and insert -- Warehouse Cloud, --, therefor.

Signed and Sealed this
Thirteenth Day of February, 2024

Katherine Kelly Vidal
*Director of the United States Patent and Trademark Office*